May 26, 1964 L. F. TRAVIS 3,134,911

MAGNETIC CONTROL CIRCUIT

Filed Dec. 15, 1961 2 Sheets-Sheet 1

INVENTOR
L. F. TRAVIS
BY
William H. Kamstra
ATTORNEY

MAGNETIC CONTROL CIRCUIT

Filed Dec. 15, 1961

2 Sheets-Sheet 2

INVENTOR
L. F. TRAVIS

BY William H. Kamstra

ATTORNEY

3,134,911
MAGNETIC CONTROL CIRCUIT

Lewis F. Travis, Andover, Mass., assignor to Bell Telephone Laboratories, Incorporated, New York, N.Y., a corporation of New York Filed Dec. 15, 1961, Ser. No. 159,592
9 Claims. (Cl. 307—88)

Figure 2A:
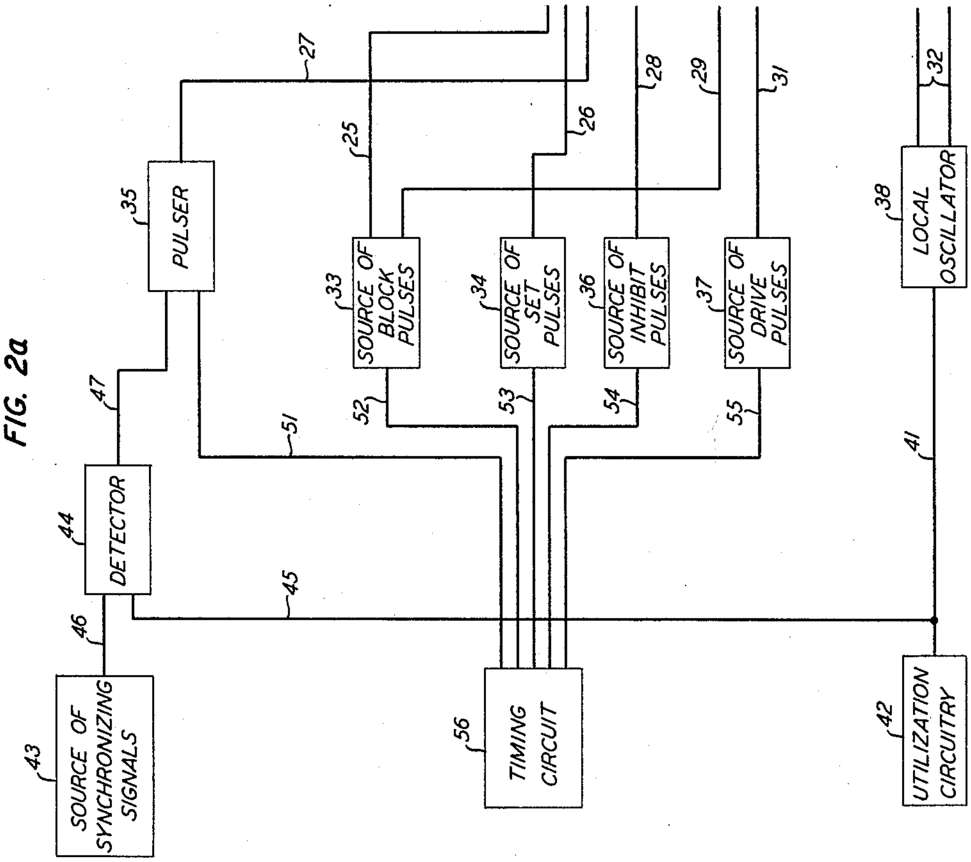

This invention relates to variable inductance circuits and more particularly to such circuits utilizing magnetic elements.

In conventional automatic phase control and automatic frequency control circuits for controlling the output of an oscillator, the output waveform of the oscillator is made to assume a fixed phase and frequency relationship with a reference waveform. A variable reactance circuit is connected in the tank circuit of the oscillator. Error signals representative of frequency or phase errors in the oscillator output are applied to the variable reactance circuit to time the local oscillator and correct its output waveform. In such systems, however, the loss of the reference waveform, for any reason, frequently results in the variable reactance circuit reassuming its initial reactance value with the oscillator output then reverting to its uncorrected state.

Accordingly it is an object of this invention to provide a variable reactance circuit for controlling the output of an oscillator which, upon the termination of a controlling input signal, remains in the reactance condition to which it was driven by the controlling signal.

It is another object of this invention to provide a variable inductance circuit for oscillators and the like comprising magnetic elements, connecting wires and signal sources only.

It is still another object of this invention to provide a variable inductance circuit which provides economies in construction and operation over previous variable inductance circuits.

It is yet another object of this invention to provide a variable inductance circuit which is more compact than variable inductance circuits heretofore available.

It is still another object of this invention to present a variable inductance capable of providing relatively small changes in the inductance value presented.

It is yet a further object of this invention to provide a new and novel electrical control circuit utilizing transfluxors, connecting wires and signal sources only.

The above and other objects of this invention are realized in one specific illustrative embodiment thereof which comprises a variable inductance circuit utilizing well known two-apertured transfluxor magnetic elements both as a means to perform various control functions and as the variable inductance itself. The circuit comprises a number of stages with each stage including a single transfluxor utilized as a variable inductor. The variable inductors of each stage are serially connected to present the total variable inductance of the circuit.

Each stage of the circuit includes a pair of selection transfluxors and a single transfluxor utilized as a gating means in addition to the transfluxor element forming the variable inductor. The operation of the entire circuit may be illustrated by considering the operation of a single stage.

A sequence of four pulses is applied to one stage of the circuit to change the value of inductance presented by its variable inductor, with the third pulse determining the value of inductance set into the variable inductor.

A block pulse drives the selection transfluxors and the gating transfluxors to the blocked condition. A set pulse then sets the selection transfluxors to the unblocked condition. A positive input control pulse next causes a flux reversal to occur in the first selection transfluxor and a resulting induced signal is applied to the variable inductance transfluxor driving it to the unblocked "maximum inductance" condition or to a partially unblocked condition depending upon the magnitude of the applied input pulse. A subsequent drive pulse applied to the gating transfluxor has no effect upon the magnetic condition of the variable inductance transfluxor since the gating transfluxor is in the blocked condition.

Should the input control pulse have been of a negative polarity, a flux reversal would have occurred in the second rather than the first selection transfluxor. A resulting induced signal applied to the gating transfluxor would have unblocked this transfluxor. A subsequent drive pulse applied to the gating transfluxor would then have driven the variable inductance transfluxor to the blocked or "minimum inductance" condition.

The variable inductance is achieved as a result of the different hysteresis loops presented by the switchable flux about the output aperture of a transfluxor when it is set to the unblocked condition, blocked condition, or to intermediate conditions therebetween. The inductance presented to a conductor threading the output aperture, and having an alternating signal impressed thereon, is a maximum for an unblocked transfluxor and a minimum for a blocked transfluxor. The signal applied to the conductor causes the switchable flux to traverse its hysteresis loop and, since inductance is related to the ratio of the change in flux to the applied current and since more flux is available for switching by a current of given magnitude in an unblocked transfluxor than in a blocked transfluxor, the inductance of the former transfluxor is the greater. Thus, the conductor threading the output aperture may be connected in the tank circuit of an energized oscillator and the frequency of the oscillator may be changed by changing the inductance presented by the transfluxor. Since the inductance presented by the transfluxor changes as it traverse its hysteresis loop, it is the average value over a full cycle that is here utilized.

A number of similar stages are connected together with the total available variable inductance then being the inductance presented to a conductor serially threading the output aperture of each of the variable inductance transfluxors. An inhibit winding may advantageously be coupled to the transfluxors of stages subsequent to the first stage and coupled by an increasing number of turns to each subsequent stage. An inhibit signal applied to the inhibit winding then biases these transfluxors such that the number of stages in which switching occurs in response to an input control signal applied to all of the stages depends upon the magnitude of the input signal.

Thus, according to one feature of this invention the particular value of inductance set into a variable inductance circuit utilizing transfluxors as the variable inductance elements thereof is determined by the magnitude and polarity of input control signals applied to the circuit.

According to another feature of this invention a variable inductance presented to a conductor threading a transfluxor, and having an alternating signal impressed thereon, is achieved by means of variation in the magnetic condition of the transfluxor.

According to another feature of this invention a variable inductance circuit is provided in which the inductance values presented to a conductor threading a plurality of transfluxors are determined by the particular magnetic conditions of the transfluxors.

According to yet another feature of this invention a variable inductance circuit utilizing transfluxors as the variable inductance elements thereof has a plurality of identical stages and an inhibit winding coupled to each stage and coupled by an increasing number of turns to each subsequent stage.

Figure 1A:
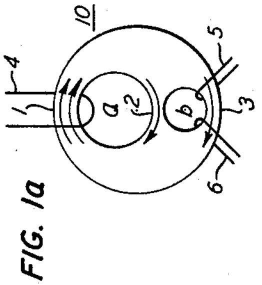
Figure 1B:
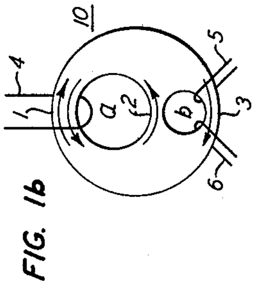
Figure 1C:
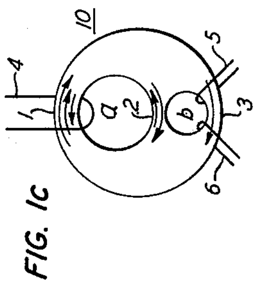
Figure 4:
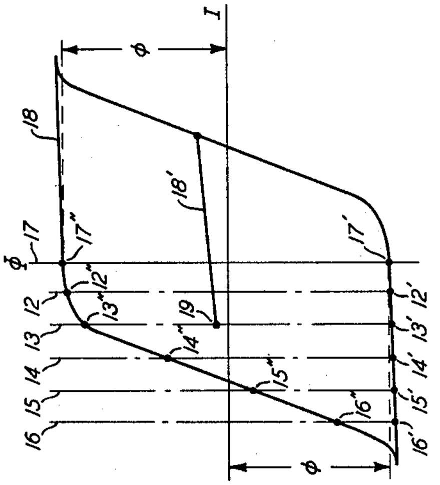
Figure 3:
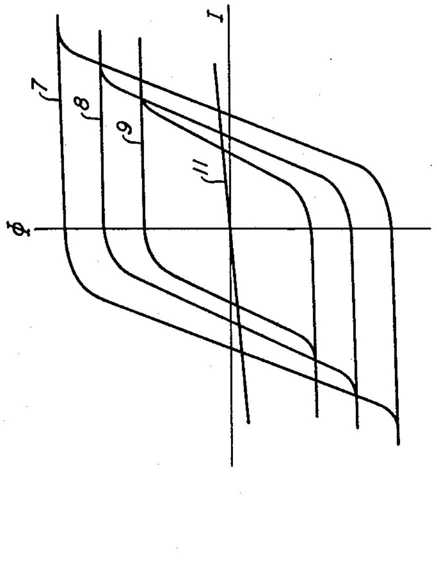
Figure 2B:
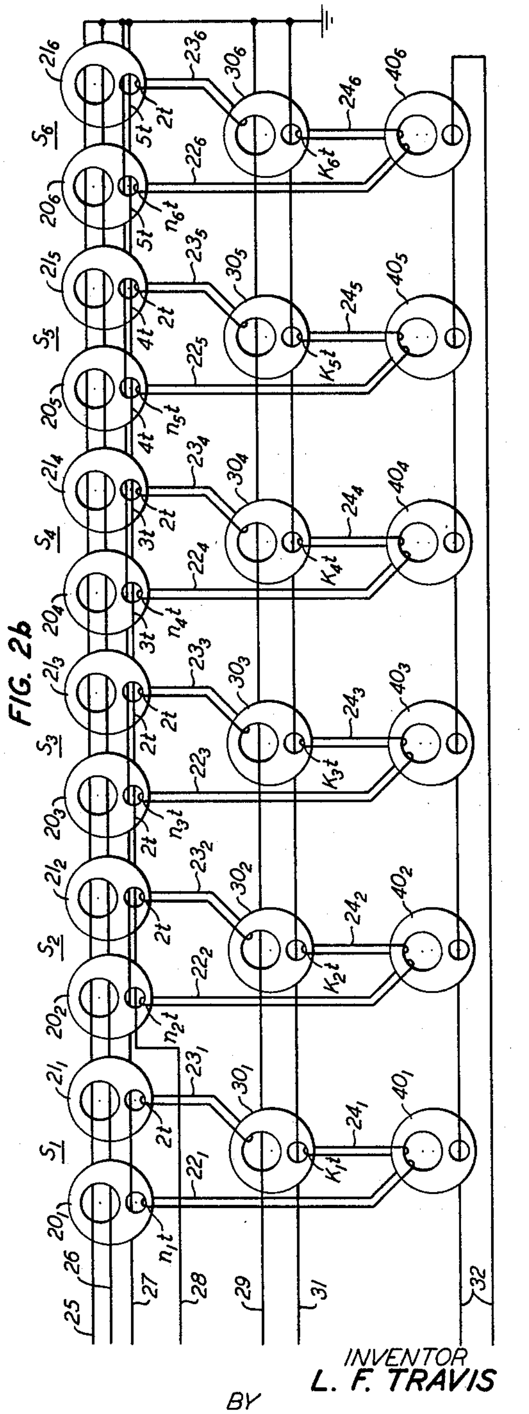

The foregoing and other objects and features of this invention will be more clearly understood from a consideration of the following detailed description thereof when taken in conjunction with the accompanying drawing in which:

FIGS. 1*a*, 1*b* and 1*c* depict, respectively, flux patterns in a two-apertured transfluxor of the type which may be utilized in this invention in three magnetic conditions manifested during the operation of this invention;

FIGS. 2*a* and 2*b* depict a single illustrative variable inductance oscillator control circuit according to the principles of this invention;

FIG. 3 depicts the effect of various magnetic conditions manifested by a transfluxor of the type shown in FIG. 1 upon the hysteresis loop presented by the material about the output aperture of the transfluxor; and FIG. 4 depicts the effect upon the hysteresis loop presented by the material about the output aperture of the transfluxor of the type shown in FIG. 1 produced by biasing magnetic fields of varying magnitudes applied to this material.

FIGS. 1*a*, 1*b* and 1*c* depict a transfluxor 10 of the character employed in this invention in a blocked, unblocked and partially unblocked magnetic condition, respectively. The transfluxor 10 is of a well known type of material having substantially rectangular hysteresis characteristics and having flux legs 1, 2 and 3 defined therein by a first control aperture *a* and a second output aperture *b*. The apertures are so positioned in the transfluxor 10 that flux leg 1 has a minimal cross sectional area at least twice that of either leg 2 or leg 3. The flux legs 2 and 3 have approximately equal minimal cross sectional areas and may therefore both be considered to have a flux carrying capacity of $\varphi$ units of flux whereas leg 1 has a capacity of at least $2\varphi$ units of flux. A control winding 4 is inductively coupled to leg 1 and a drive winding 5 and output winding 6 are inductively coupled to leg 3 of transfluxor 10.

A current signal applied to control winding 4 of a polarity and magnitude to establish the flux directions indicated by the arrows in FIG. 1*a* thereby places the transfluxor in the blocked magnetic condition. A subsequent drive signal applied to drive winding 5 cannot cause a flux reversal to take place about the flux path including legs 2 and 3 since the remanent flux in one of the legs 2 and 3 is already in the direction to which it would be driven by the drive signal regardless of the polarity of the drive signal, hence the "blocked" condition. An alternating signal applied to the drive winding 5 of a magnitude insufficient to cause flux switching to occur between leg 3 and leg 1 can therefore induce only a shuttle signal of small magnitude in output winding 6.

The transfluxor 10 is set to the unblocked magnetic condition depicted by the directional arrows in FIG. 1*b* by the application of a signal to control winding 4 of a character to reverse $\varphi$ units of flux in leg 1. Substantially all of this flux switching is completed through leg 2. A subsequent drive signal applied to drive winding 5 can then switch $\varphi$ units of flux between legs 2 and 3 thereby inducing an output signal in winding 6.

The transfluxor 10 is set to a partially unblocked condition, such as that depicted by the directional arrows in FIG. 1*c*, by the application of a signal to control winding 4 of a character to reverse less than $\varphi$ units of flux in leg 1. There consequently are less than $\varphi$ units of flux available for switching between legs 2 and 3 and a drive signal applied to winding 5 induces an output signal in winding 6 of a smaller magnitude than that induced when the transfluxor 10 is in the unblocked condition.

Turning now to FIGS. 2*a* and 2*b*, we may see that a specific illustrative embodiment according to the principles of this invention is there depicted. FIG. 2*a* shows the left portion of the circuit of this embodiment while FIG. 2*b* shows the right portion. The use of FIG. 2 without the letter *a* or *b* will hereinafter refer to the entire circuit shown in FIGS. 2*a* and 2*b*. The variable inductor circuit of FIG. 2 comprises a plurality of stages, designated $S_1$ through $S_6$ each of which in turn comprises a pair of selection transfluxors 20 and 21, a gating transfluxor 30, and a variable inductance transfluxor 40. Each of the transfluxors of FIG. 2 is identical in structure to the transfluxors described in conjunction with the discussion of FIGS. 1*a*, 1*b* and 1*c*, each having flux legs 1, 2 and 3 and apertures *a* and *b* therein as previously discussed although not so designated in FIG. 2 for purposes of simplicity. The selection transfluxors 20 of each of the stages are, respectively, coupled to leg 1 of the variable inductance transfluxors 40 of each of the stages by means of coupling loops 22. The selection transfluxors 21 of each of the stages are, respectively, coupled to leg 1 of the gating transfluxors 30 of each of the stages by means of coupling loops 23. The gating transfluxors 30 are in turn coupled to leg 1 of the variable inductance transfluxors 40 of each of the stages, respectively, by means of coupling loops 24.

Each of the transfluxors of a stage is associated with the corresponding transfluxor of each of the succeeding stages by means of a plurality of conductors energized in various steps of operation of the circuit of FIG. 2 in a manner hereinafter to be described. Specifically, the control apertures *a* of each of the pairs of selection transfluxors 20 and 21 of the stages are threaded by conductors 25 and 26, the threading in the case of each of the individual transfluxors of the transfluxor pairs 20 and 21 being in the same sense. The output apertures *b* of the selection transfluxors 20 and 21 of each of the stages is serially threaded by a conductor 27, the threading alternating in sense between the individual transfluxors 20 and 21 of the selection transfluxor pairs. A conductor 28 links the output apertures *b* of each of the selection transfluxors 20 and 21 of the second and subsequent stages, linking the aforesaid transfluxors of subsequent stages by an increasing number of turns. Although for purposes of illustrative simplicity the conductor 28 is shown merely threading each of the aforesaid transfluxors the number of turns by which it is coupled to these transfluxors is indicated in the drawing. For example, conductor 28 threads transfluxors $\mathbf{20_2}$ and $\mathbf{21_2}$, links transfluxors $\mathbf{20_3}$ and $\mathbf{21_3}$ by two turns, transfluxors $\mathbf{20_4}$ and $\mathbf{21_4}$ by three turns, etc.

The association of the individual stages of the circuit of FIG. 2 is continued by the threading of the control apertures *a* of the gating transfluxors 30 of each of the stages by a conductor 29. A conductor 31 threads each of the output apertures *b* of the aforesaid transfluxors. Finally, a conductor 32 threads the output apertures *b* of each of the variable inductance transfluxors 40.

The conductors 25 through 29, and 31 are connected between a source of ground potential and a source of blocking pulses 33, a source of set pulses 34, a pulser circuit 35, a source of inhibit pulses 36, said source of blocking pulses 33, and a source of drive pulses 37, respectively. Conductor 32 is connected to local oscillator 38.

The pulse sources 33, 34, 36 and 37 may comprise well known circuits capable of providing current pulses of the character described hereinafter and, consequently, are represented in block diagram form. Conductor 32 is connected to the tank circuit of local oscillator 38 and variations in the inductance value applied to oscillator 38 by the transfluxors $\mathbf{40_1}$ through $\mathbf{40_6}$ produce variations in the frequency of oscillation of oscillator 38 when the oscillator is energized and alternating signals in its tank circuit pass through conductor 32. Conductor 41 connects the output of oscillator 38 to utilization circuitry 42. The circuitry 42 may comprise any circuitry to which it is necessary to apply a signal which is in frequency or phase synchronization with a synchronizing signal from a source of synchronizing signals 43. The oscillator 38 and utilization circuitry 42 may comprise well known circuits and, consequently, are shown in block diagram form. Source 43 may comprise any source of synchronizing signals to which the output of oscillator 38 is to be synchronized and is also shown in block diagram form. A detector 44 is connected to oscillator 38 by conductors 41 and 45 and to source 43 by conductor 46 and may comprise any circuit capable of detecting frequency or phase variations between two input signals and producing an output the magnitude of which is proportional to these variations and the polarity of which is determined by the sense of the variation between the two input signals. Conductor 47 connects the output signal of detector 44 to pulser 35 which comprises circuitry capable of producing discrete output pulses of a magnitude proportional to the direct current signal applied to it from detector 44 and of the same polarity as the signal from detector 44. Detector 44 and pulser 35 also comprise circuits known in the art and are also shown in block diagram form. Conductors 51 through 55 connect pulser 35 and the sources 33, 34, 36 and 37, respectively, to a timing circuit 56 which may comprise any well known circuit capable of sequentially activating pulser 35 and sources 33, 34, 36 and 37 as described hereinafter and is also shown in block diagram form.

The inductance presented to the local oscillator 38 by the variable inductance transfluxors 40 of each of the stages is dependent upon the magnetic condition of these transfluxors. FIG. 3 depicts the hysteresis loops presented by the flux path about output aperture *b* of a transfluxor of the type shown in FIG. 1 when the transfluxor is in various magnetic conditions. Thus hysteresis loop 7 is that presented by such a transfluxor in the unblocked condition and loops 8 and 9 are those presented during two different partially unblocked conditions. The line 11 represents the hysteresis characteristic of such a transfluxor in the blocked condition in which the only flux changes about the output aperture *b* result from one of the legs forming the flux path about this aperture being driven from a condition of remanent magnetization to a saturated magnetic condition. Since inductance is proportional to the ratio of a change in flux to an applied current and since more flux is available for switching by a current of given magnitude in an unblocked transfluxor than in a blocked transfluxor the inductance of the former is greater. Thus, the inductance presented to the local oscillator 38 of FIG. 2 is dependent upon the particular magnetic conditions of the transfluxors 40 when an alternating signal applied to conductor 32 causes these transfluxors to traverse their respective hysteresis loops.

FIG. 4 depicts a hysteresis loop 18 presented by the flux path about output aperture *b* of a transfluxor of the type shown in FIG. 1 when the transfluxor is in the unblocked condition. The ordinate 17 shows the remanent points 17′ and 17″ on the loop 18 for unbiased selection transfluxors $\mathbf{20_1}$ and $\mathbf{21_1}$ of the first stage of the circuit shown in FIG. 2. The ordinates 12 through 16, shown in dot-dash lines, show the remanent points 12′ through 16′ and 12″ through 16″ on the loop 18 for the selection transfluxors $\mathbf{20_2}$ and $\mathbf{21_2}$, $\mathbf{20_3}$ and $\mathbf{21_3}$, $\mathbf{20_4}$ and $\mathbf{21_4}$, $\mathbf{20_5}$ and $\mathbf{21_5}$, and $\mathbf{20_6}$ and $\mathbf{21_6}$, respectively, when these transfluxors are biased by an inhibit signal applied to conductor 28 from source 36. Thus, it can be seen that an input signal applied to conductor 27 from pulser 35 of a magnitude and polarity just sufficient to drive unbiased transfluxor $\mathbf{20_1}$ from remanent point 17′ to the point of opposite remanence 17″ will switch the remanent flux in this transfluxor from a value of $-\varphi$ units of flux to a value of $+\varphi$ units of flux. Such an input signal will switch succeedingly smaller amounts of flux in the succeeding transfluxors $\mathbf{20_2}$ through $\mathbf{20_6}$ since it will not cause traversal of the entire hysteresis loop 18 of these transfluxors but rather will cause a return to a remanent point such as 19 along a portion of a minor hysteresis loop such as 18′. Thus, it is apparent that the magnitude and duration of the input control signal applied to conductor 27 from pulser 35 determines the number of stages in which flux switching occurs and the amount of flux switching in those stages.

It is furthermore apparent from FIG. 4 that the maximum net amount of flux that can be switched when an inhibited transfluxor is switched between the remanent points on its major hysteresis loop, such as the points 15′ and 15″, is considerably less than the amount of flux switched between the remanent points 17′ and 17″ of an unbiased transfluxor. This latter feature will be again referred in connection with the following description of an illustrative operation of the circuit of FIG. 2.

Initially, positive current pulses are simultaneously applied to conductors 25 and 29 from source 33 to drive each of the selection transfluxors 20 and 21 and each of the gating transfluxors 30 to the blocked magnetic condition. The blocked condition is considered for purposes of this operation that in which all of the remanent flux about the transfluxors as depicted in FIG. 2 is in a clockwise direction as previously described in connection with FIG. 1*a*. Subsequently a negative current pulse is applied to conductor 26 from source 34 to set each of the selection transfluxors 20 and 21 to the unblocked condition. Next a positive inhibit pulse applied to conductor 28 from source 36 biases the selection transfluxors $\mathbf{20_2}$ through $\mathbf{20_6}$ and $\mathbf{21_2}$ through $\mathbf{21_6}$ substantially as indicated in FIG. 4 by the ordinates 12 through 16, respectively. An input signal is applied to conductor 27 from pulser 35 coincidently with the inhibit pulse from source 36.

Assume, for example, that a variation in signals from oscillator 38 and source 43 indicates that the inductance presented by the transfluxors 40 should be increased. Accordingly, a signal from detector 44 applied to pulser 35 results in a positive input control pulse being applied to conductor 27. Assume further that the input pulse is of a magnitude sufficient to cause the remanent magnetization of the flux path about output aperture *b* of each of the selection transfluxors $\mathbf{20_1}$ through $\mathbf{20_4}$ to switch completely from one remanent point on their major hysteresis loop 18, shown in FIG. 4, to their other remanent point on loop 18, but sufficient only to switch selection transfluxors $\mathbf{20_5}$ and $\mathbf{20_6}$ to remanent points on minor hysteresis loops.

Considering, for the moment, the first stage only, the input signal drives the magnetization of the flux path about output aperture *b* of selection transfluxors $\mathbf{20_1}$ from point 17′ on loop 18 of FIG. 4 to point 17″. It has, however, no appreciable effect upon the corresponding flux path of transfluxor $\mathbf{21_1}$ since conductor 27 threads this transfluxor in a sense such that the signal drives the magnetization of the flux path about output aperture *b* of this transfluxor from the point 17′ on one side of loop 18 to saturation on the same side of the loop 18. The flux switching in transfluxor $\mathbf{20_1}$ induces a signal in coupling loop $\mathbf{22_1}$ which signal drives variable inductance transfluxor $\mathbf{40_1}$ to the unblocked or maximum inductance condition. A subsequent drive pulse applied to conductor 31 from source 37 has no effect upon gating transfluxor $\mathbf{30_1}$ since this transfluxor is in the blocked magnetic condition.

In a similar manner, the flux switching occurring in selection transfluxors $\mathbf{20_2}$ through $\mathbf{20_6}$ is transferred to variable inductanec transfluxors $\mathbf{40_2}$ through $\mathbf{40_6}$, respectively. Transfluxors $\mathbf{40_2}$ through $\mathbf{40_4}$ are thereby also driven to the unblocked or maximum inductance condition while transfluxors $\mathbf{40_5}$ and $\mathbf{40_6}$ are driven to partially unblocked conditions since the input control signal applied to conductor 27 was insufficient to fully switch transfluxors $\mathbf{20_5}$ and $\mathbf{20_6}$.

Assume, further, that the resulting inductance presented by the transfluxors $\mathbf{40_1}$ through $\mathbf{40_6}$ is now more than the value required to synchronize oscillator 38 with the signal from source 43. Accordingly, after the application of a blocking signal to conductors 25 and 29 and an unblocking signal to conductor 26 in the manner previously described, a second input control signal is applied to conductor 27 from pulser 35 coincidently with an inhibit pulse applied to conductor 28. This input signal will be of a negative polarity and assume that it is of a magnitude to cause flux switching only in selection transfluxors $21_1$ and $21_2$.

The flux switching in transfluxors $21_1$ and $21_2$ caused by this input signal induces signals in coupling loops $23_1$ and $23_2$ which signals in turn drive gating transfluxors $30_1$ and $30_2$ to unblocked or partially unblocked magnetic conditions. A subsequent drive pulse from source 37 applied to conductor 31 causes flux switching to occur in transfluxors $30_1$ and $30_2$ thereby inducing signals in coupling loops $24_1$ and $24_2$ which drive variable inductance transfluxors $40_1$ and $40_2$ to the blocked or minimum inductance condition.

If the inductance presented by the variable inductance transfluxors 40 is now slightly less than the value required to synchronize oscillator 38 and the signal from source 43, a third input control signal is subsequently applied to conductor 27 to again increase the inductance values presented by transfluxors $40_1$ and $40_2$.

Thus, the oscillator 38 may be synchronized with the signal from source 43 in the manner described above by a sequence of input pulses of alternating polarity and decreasing magnitude. The detector 44 and pulser 35 are advantageously chosen to present input control pulses to conductor 27 of a magnitude sufficient to cause a resulting change in the inductance presented by the variable inductance transfluxors 40 of a magnitude slightly greater than that needed to synchronize oscillator 38 and source 43. Accordingly, oscillator 38 and source 43 are synchronized by a sequence of input control pulses of alternating polarity. Such synchronization would not result from consecutive input control pulses of the same polarity since an input control pulse will produce no change in the value of inductance presented by the variable inductance transfluxors 40 if it has been immediately preceded by an input control pulse of the same polarity and a greater magnitude.

The number of turns by which each of the coupling loops are coupled to the various transfluxors are advantageously utilized to effect the transfer of the proper amount of flux to the variable inductance transfluxors 40. Such use of connecting loops is discussed in an article by U. F. Gianola entitled "Integrated Magnetic Circuits for Synchronous Sequential Logic Machines" appearing at page 295 of the March 1960 issue of The Bell System Technical Journal. Thus, for example, in order to transfer to transfluxor $30_1$ the same amount of flux as is switched from transfluxor $21_1$ the coupling loop $23_1$ must be coupled to transfluxor $21_1$ by more turns than it is coupled to transfluxor $30_1$ in order to make up for transfer losses. The Gianola article states that for transfluxors of the type described herein and coupling loops having a resistance of only a few tenths of an ohm, a flux gain of approximately unity can be achieved by coupling the connecting loop $23_1$ to transfluxor $30_1$ by a single turn and to transfluxor $21_1$ by two turns. Thus to achieve a flux gain of approximately unity each of the coupling loops 23 is connected to a selection transfluxor 21 by two turns, as indicated in FIG. 2, and to a gating transfluxor 30 by a single turn.

As explained previously in connection with the discussion of FIG. 4, the maximum net amount of flux that can be switched by an inhibited transfluxor switching between the remanent points on its hysteresis loops, such as the point 15′ and 15″ on loop 18 of FIG. 3, is considerably less than the amount of flux switched between the remanent points 17′ and 17″ of an unbiased transfluxor. Thus, if coupling loops $22_1$ through $22_6$ were coupled to selection transfluxors $20_1$ through $20_6$ by two turns and to variable inductance transfluxors $40_1$ thorugh $40_6$ by a single turn, in order to achieve a flux gain of approximately unity, then those of the transfluxors $40_1$ through $40_6$ associated with biased ones of the transfluxors $20_1$ through $20_6$ would never be driven to the unblocked condition regardless of the magnitude of the input signal applied to conductor 27 from pulser 35. The loops $22_1$ through $22_6$ are therefore coupled to the transfluxors $20_1$ through $20_6$ by $n_1$ through $n_6$ turns, respectively, as indicated in FIG. 2, in order to achieve flux gains greater than unity. The values of $n_1$ through $n_6$ are chosen so that a maximum amount of flux transfer in the transfluxors $20_1$ through $20_6$, respectively, results in the transfluxors $40_1$ through $40_6$, respectively, being driven from the blocked to the unblocked magnetic condition. Thus, for example, since transfluxor $20_1$ is not biased, loop $22_1$ would be coupled to transfluxor $40_1$ by two turns therefore making $n_1$ equal to 2.

Similarly, coupling loops $24_1$ through $24_6$ are coupled to gating transfluxors $30_1$ through $30_6$, respectively, by $k_1$ through $k_6$ turns, respectively, as indicated in FIG. 2, and to variable inductance transfluxors $40_1$ through $40_6$, respectively, by single turns in order to achieve flux gains greater than unity. The value of $k_1$ is chosen so that an arbitrarily small amount of flux switching in selection transfluxor $21_1$, caused by a negative input control signal from pulser 35 is sufficient to permit the signal induced in loop $24_1$, upon the application of a drive pulse from source 37, to drive transfluxor $40_1$ to a blocked condition. Likewise, values of $k_2$ through $k_6$ are chosen so that arbitrarily small amounts of flux switching in transfluxors $21_1$ through $21_6$, respectively, result in transfluxors $40_2$ through $40_6$, respectively, being subsequently driven to the blocked magnetic condition.

What has been described is considered to be only one illustrative embodiment according to the principles of the present invention and it is to be understood that numerous other arrangements may be devised by one skilled in the art without departing from the spirit and scope thereof.

What is claimed is:

1. An electrical control circuit comprising a first and second selection transfluxor and a third control transfluxor, each of said transfluxors having a first and a second aperture defining a first, second and third flux leg therein, said second and third flux legs having substantially the same minimal cross sectional areas and said first flux leg having a minimal cross sectional area at least twice that of said second flux leg, means coupled to said first and second selection transfluxors for selectively blocking and unblocking said last mentioned transfluxors, an input winding coupled to the flux path including the second and third leg of said first selection transfluxor in one sense and coupled to the flux path including the second and third legs of said second selection transfluxor in the opposite sense, means for selectively applying bipolar input signals to said input winding, means coupled to said first selection transfluxor and said control transfluxor controlled by said input signals of one polarity for unblocking said control transfluxor, and means coupled to said second selection transfluxor and said control transfluxor controlled by said input signals of the opposite polarity for blocking said control transfluxor.

2. An electrical control circuit according to claim 1 further comprising a utilization winding inductively coupled to the flux path including the second and third flux legs of said control transfluxors and means for applying excitation signals of alternating polarity to said utilization winding.

3. An electrical control circuit according to claim 2 in which said means for blocking said control transfluxor comprises a gating transfluxor structurally similar to said selection and control transfluxors, first coupling means inductively coupled to the flux path including the second and third legs of said second selection transfluxor and to the flux paths including the first leg of said gating transfluxor, and second coupling means inductively coupled to the flux path including the second and third legs of said gating transfluxor and to the flux paths including the first leg of said control transfluxor.

4. An electrical control circuit according to claim 3 in which said first coupling means is inductively coupled to said second selection transfluxor by $n$ turns and to said gating transfluxor by $n/2$ turns.

5. An electrical control circuit according to claim 4 in which said means for unblocking said control transfluxor comprises third coupling means inductively coupled to the flux path including the second and third legs of said first selection transfluxor and to the flux paths including the first leg of said control transfluxor.

6. An electrical control circuit according to claim 4 further comprising an inhibit winding inductively coupled to the flux paths including the second and third legs of said first and second selection transfluxors and means for applying an inhibit signal to said inhibit winding of a polarity to oppose flux switching in said first and second selection transfluxors responsive to said bipolar input signals.

7. An electrical circuit comprising a plurality of sequentially ordered stages, each of said stages comprising a first and second two-apertured selection transfluxor and a third two-apertured control transfluxor, each of said transfluxors having a first, second and third flux leg therein, said second and third flux legs having substantially the same minimal cross sectional areas and said first flux leg having a minimal cross sectional area at least twice that of said second flux leg, means coupled to said first and second selection transfluxors of each of said stages for selectively blocking and unblocking said transfluxors, an input winding coupled to the flux path including the second and third legs of said first selection transfluxor of each of said stages in one sense and coupled to the flux path including the second and third legs of said second selection transfluxor of each of said stages in the opposite sense, means for selectively applying bipolar input signals to said input winding, means coupled to the first selection transfluxor and control transfluxor of each of said stages controlled by said input signals of one polarity for unblocking said control transfluxors, means coupled to the second selection transfluxor and control transfluxor of each of said stages controlled by said input signals of the opposite polarity for blocking said control transfluxors, a utilization winding inductively coupled to the flux path including the second and third legs of each of said control transfluxors, and means for applying excitation signals of alternating polarity to said utilization winding.

8. An electrical circuit according to claim 7 further comprising an inhibit winding inductively coupled to the flux paths including the second and third legs of the first and second selection transfluxors of all except the first one of said stages, said inhibit winding being coupled to said selection transfluxors of succeeding ones of said stages by an increasing number of turns, and means for applying an inhibit signal to said inhibit winding of a polarity to oppose flux switching in said first selection transfluxors of all except the first one of said stages in response to input signals of one polarity and to oppose flux switching in said second selection transfluxors of all except the first one of said stages in response to input signals of the opposite polarity.

9. An electrical circuit comprising a sequence of two-apertured selection transfluxors having a first, second, and third flux leg therein, said second and third flux legs having substantially the same minimal cross sectional area and said first flux leg having a minimal cross sectional area at least twice that of said second flux leg, means for blocking and unblocking said transfluxors, an input winding inductively coupled in one sense to the flux paths including the second and third legs of one set of alternate ones of said transfluxors and inductively coupled in the opposite sense to the flux paths including the second and third legs of the other set of alternate ones of said transfluxors, means for selectively applying bipolar input signals to said input winding, an inhibit winding inductively coupled to the flux paths including the second and third legs of all of said transfluxors, said inhibit winding being coupled to succeeding pairs of said transfluxors by an increasing number of turns, means for applying an inhibit signal to said inhibit winding of a polarity to oppose flux reversal about the flux path including the second and third legs of one transfluxor of each of said pair of transfluxors in response to input signals of one polarity and about the flux path including the second and third legs of the other transfluxor of each of said pairs in response to input signals of the other polarity, and output windings inductively coupled, respectively, to the flux paths including the second and third legs of said sequence of transfluxors.

No references cited.